United States Patent [19]

Magoolaghan

[11] Patent Number: 4,809,544

[45] Date of Patent: Mar. 7, 1989

[54] UNIVERSAL METHOD AND APPARATUS FOR TESTING A VALVE BODY FOR AN AUTOMATIC TRANSMISSION

[76] Inventor: Jack Magoolaghan, 81 8th Ave., Kings Park, N.Y. 11754

[21] Appl. No.: 138,705

[22] Filed: Dec. 28, 1987

Related U.S. Application Data

[63] Continuation-in-part of Ser. No. 930,538, Nov. 14, 1986, abandoned.

[51] Int. Cl.⁴ .................................................. G01M 13/02
[52] U.S. Cl. .................................................. 73/118.1
[58] Field of Search ............... 73/118.1, 119 R, 49.7, 73/162, 865.9

[56] References Cited

U.S. PATENT DOCUMENTS

| | | | |
|---|---|---|---|
| 2,918,822 | 12/1959 | Mann, Jr. | 73/118.1 |
| 3,213,674 | 10/1965 | Salcido et al. | 73/118.1 |
| 3,273,384 | 9/1966 | Flaugher | 73/118.1 |
| 3,389,600 | 6/1968 | Rau | 73/118.1 |
| 3,967,495 | 7/1976 | Wesner et al. | 73/118.1 |
| 4,356,724 | 11/1982 | Ayoub et al. | 73/118.1 |

FOREIGN PATENT DOCUMENTS 0769386 10/1980 U.S.S.R. ............... 73/118.1

*Primary Examiner*—Stewart J. Levy
*Assistant Examiner*—Robert R. Raevis
*Attorney, Agent, or Firm*—Michael I. Kroll

[57] ABSTRACT

A method and apparatus for testing a valve body is provided that will isolate several possible trouble causes in order to determine what is actually causing the problem in the transmission, or torque converter, or related components.

2 Claims, 1 Drawing Sheet

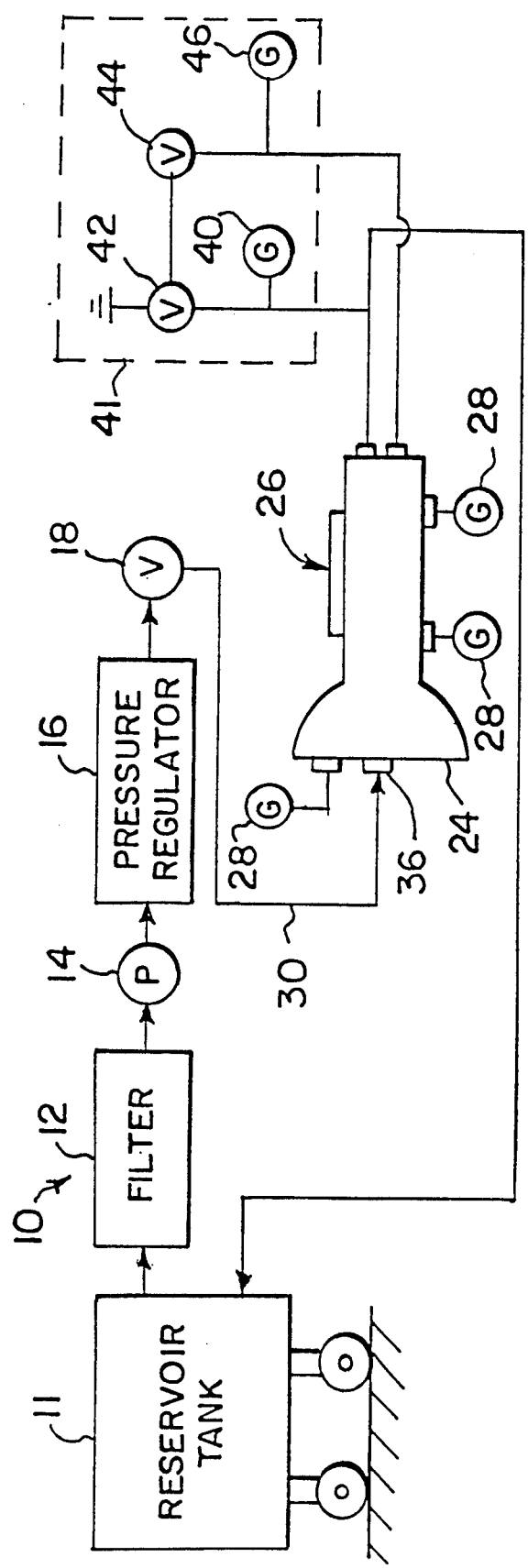

UNIVERSAL METHOD AND APPARATUS FOR TESTING A VALVE BODY FOR AN AUTOMATIC TRANSMISSION

BACKGROUND OF THE INVENTION

This application is a Continuation-In-Part application of application Ser. No. 930,538 filed Nov. 14, 1986 and now abandoned.

FIELD OF THE INVENTION

The present invention relates to valve bodies. More particularly, the present invention relates to a method and apparatus for testing a valve body which enables a technician to test the valve body without driving the transmission in the conventional method.

DESCRIPTION OF THE PRIOR ART

Numerous transmissions have been provided in prior art that are adapted to include test plugs on the exterior which enables technicians to determine the pressure at a particular band or clutch combination while the vehicle engine is running. The problem with this type of test is that the data is pure result with no indication of the cause. This is because there is no attempt to eliminate the reliance of correct unit (clutches and bands) operation to the correct valve body operation or vise versa and because most transmissions lack a sufficient number of test ports.

Identifying the cause of a problem using this method requires an additional and elaborate "process of elimination" type of diagnosis procedure. It is often impossible to correctly identify an internal problem this way. The working life of the transmission can be predicated in part by the amount of pressure which each individual clutch/band receives under direction of the valve body.

While these units may be suitable for the particular purpose to which they address, they would not be as suitable for the purposes of the present invention as heretofore described.

SUMMARY OF THE INVENTION

A primary object of the present invention is to provide a method and apparatus for testing a valve body that will overcome the shortcomings of the prior art devices.

Another object is to provide a method and apparatus for testing a valve body that will isolate several possible trouble causes in order to determine what is actually causing the problem in the transmission, or torque converter, or related components.

An additional object is to provide a method and apparatus for testing a valve body that can predict the working life of the transmission.

Another additional object is to provide a method and apparatus for testing a valve body that can be used with the transmission in or out of the vehicle.

A further object is to provide a method and apparatus for testing a valve body that is simple and easy to use.

A still further object is to provide a method and apparatus for testing a valve body that is economical in cost to manufacture and has the ability to test the valve body separate from the transmission unit and to maintain absolute control of the flow and pressure to the valve body without reliance on hydraulic pumps or governors within the transmission device or on the fluid passages within the transmission case.

Another object is to provide a method of visually testing a valve body on a separate valve body test unit having designated clutch/band inputs, the valve body using low pressure hydraulic fluid at a low speed and being removed from a transmission, comprising the steps of attaching the valve body to the separate valve body test unit which is separate from the transmission, coupling a plurality of pressure gauges to the separate valve body test unit, coupling a governor simulator in fluid communication to the separate valve body test unit, pumping low pressurized fluid from a separate source through the separate valve body test unit, and observing the plurality of pressure gauges when the valve body is in operation to see if the valve body distributes the correct amount of the low pressurized fluid at the low speed to the designated clutch/band inputs in the separate valve body test unit Yet another object is to provide a portable device for visually testing a valve body having designated clutch/band inputs and using hydraulic fluid at a low pressure and speed and being removed from a transmission, comprising a separate valve body test unit having the valve body attached to said separate valve body test unit and being separate from the transmission, a plurality of pressure gauges disposed separate from and in fluid communication with said valve body test unit, a governor simulator coupled to said separate valve body test unit, and means for pumping the hydraulic fluid at the low pressure through the separate valve body test unit which is removed from the transmission so that a person can observe said plurality of pressure gauges when the valve body is in operation independent of the transmission to see if the valve body distributes the correct amount of the low pressurized hydraulic fluid at the low speed to the designated clutch/band inputs in the separate valve body test unit.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING

The sole FIGURE is a diagrammatic block diagram of the valve body tester of the present invention.

DETAILED DESCRIPTION OF THE PREFERRED EMBODIMENTS

Turning now descriptively to the drawing, the sole FIGURE illustrates a device 10 for testing a valve body 26 consisting of a remote valve body test unit 24. The valve body 26 is attached to the remote valve body test unit 24. Pressure gauges 28 are coupled to the remote valve body test unit 24. A manually controlled governor simulator 41, having valves 42 and 44 and gauges 40 and 46, is coupled to the remote valve body test unit 24.

There are two types of automatic governors in todays automatic transmissions. There are the normally closed and the normally open types. Both types are in some form driven by the transmissions output shaft. The output shaft speed of rotation becomes the index to the governor of the vehicle's speed. At pre-determined speeds, the governors operate as either the normally closed type or the normally open type.

The normally closed type allows pressure from a line within the valve body which runs in parallel with the line to the forward band or clutches, to pass through the governor and back into a different line within the valve body which connects with the respective shift valves. As the vehicle speed increases, the governor pressure increases thereby effecting upshifts. As vehicle speed decreases, governor pressure decreases, thereby effecting downshifts.

The normally open type reduces the amount of flow of fluid from a line within the valve body which runs in parallel with the line to the forward band or clutches, out through the governor, to exhaust, so as to control the governor pressure within the valve body. When the governor closes, governor pressure increases, thereby effecting an upshift. When the governor opens, the governor pressure decreases, thereby effecting a downshift.

Both types of governors operate as centrifical devices moving in relation to transmission ouput shaft speed or vehicle speed.

In the present invention a governor assembly 41 simulates both types of governors without requiring the rotation of any transmission parts. In the closed type, a gauge 46 is connected to the "To Governor" port on the valve body test unit 24 which is connected in parallel with the "To Forward Clutch/Band" port on the test unit 24. A gauge 40 is connected to the "From Governor" port of the valve body test unit 24. Gauge 40 will register miles per hour. As a valve body 26 is tested in the drive range, valves 44 and 42 are both closed, gauge 46 is reading line pressure, and gauge 40 is reading zero M.P.H. By slowly opening valve 44, gauge 40 can read the speeds at which the valve body 26 upshifts, as indicated on gauges At the same time gauges 28 can be read to determine the locations, speed, and pressure with which valve body 26 directs the fluid during the upshifts.

Once valve 44 is opened it is difficult to effect a valve body 26 downshift because there will be pressure on both sides at gauges 46 and 40. To test valve body downshifts valve 44 must be closed thereby holding vehicle speed static. Valve 42 is then opened slowly to reduce the governor pressure. By reading gauge 40 and observing gauges 28, the speeds at which the valve body 26 will downshift can be determined.

In the open type, gauge 46 and the lines connected to it are not used during this test. Valve 44 is closed. Gauge 40 is connected to the "To Governor" port on the valve body test unit 24. Valve 42 is fully open when valve body 26 is shifted into drive. In this position, valve body 26 registers "Drive Range-First Gear" on gauges 28. Valve 42 is closed slowly and the resultant increase in governor pressure is read as M.P.H. on gauge 40. By reading gauge 40 and observing gauges 28, the location, speed, and force with which the valve body 26 is directing the fluid during the upshifts can be determined. By slowly re-opening valve 42 while reading gauge 40 and observing gauges 28, the speeds at which the valve body 26 will downshift can be determined.

A filter 12, a pump 14, a pressure regulator 16 and a manual control valve 18 is provided for pumping pressurized fluid from a remote source, such as a reservoir tank 11 through the remote transmission test unit 24 via flex line 30 and coupler 36. A person (not shown) can observe the pressure gauges 28 when the valve body 26 is in operation to see if the valve body 26 will distribute the correct amount of pressurized fluid at a correct speed, not rate of flow, to the clutches and bands in the remote transmission test unit 24. The manufacturer's published specifications are the ultimate determination of an acceptable valve body.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A method of visually testing a valve body on a separate valve body test unit having designated clutch/band inputs, said valve body using low pressure hydraulic fluid at a low speed and being removed from a transmission, said method comprising the steps of:
   (a) attaching the valve body to the separate valve body test unit which is separate from the transmission;
   (b) coupling a plurality of pressure gauges to the separate valve body test unit;
   (c) coupling a governor simulator in fluid communication to the separate valve body test unit;
   (d) pumping low pressurized fluid from a separate source through the separate valve body test unit; and
   (e) observing the plurality of pressure gauges when the valve body is in operation to see if the valve body distributes the correct amount of the low pressurized fluid at the low speed to the designed clutch/band inputs in the separate valve body test unit.

2. A portable device for visually testing a valve body having designated clutch/band inputs and using hydraulic fluid at a low pressure and speed and being removed from a transmission, comprising:
   (a) a separate valve body test unit having the valve body attached to said separate valve body test unit and being separate from the transmission;
   (b) a plurality of pressure gauges disposed separate from and in fluid communication with said valve body test unit;
   (c) a governor simulator coupled to said separate valve body test unit; and
   (d) means for pumping the hydraulic fluid at the low pressure through the separate valve body test unit which is removed from the transmission so that a person can observe said plurality of pressure gauges when the valve body is in operation independent of the transmission to see if the valve body distributes the correct amount of the low pressurized hydraulic fluid at the low speed to the designated clutch/band inputs in the separate valve body test unit.

* * * * *